3,423,224
METHOD FOR COATING AND RESURFACING PAVED SURFACES WITH RESINOUS MORTARS
Robert J. Schmidt, El Cerrito, and Lawrence E. Santucci, Corte Madera, Calif., assignors to Chevron Research Company, San Francisco, Calif., a corporation of Delaware
No Drawing. Continuation of application Ser. No. 194,720, May 14, 1962. This application Jan. 25, 1967, Ser. No. 620,205
U.S. Cl. 117—2     2 Claims
Int. Cl. C09k 3/14; E01c 11/24

ABSTRACT OF THE DISCLOSURE

A method is provided for laying durable, flexible, skid-proof surface-coatings on paved surfaces, as in resurfacing portland cement concrete highways and roads, bridge decks and the like, by applying to the paved base a mortar formed by mixing a polyester resin, styrene and selectively graded mineral aggregate, initiating the setting of the mortar, and allowing the same to harden at ambient temperatures.

---

The present application is a continuation of application Ser. No. 194,720, filed May 14, 1962, by the same applicants and now abandoned.

The present invention relates to a novel composite surfacing material and to a method of preparing and applying this material to paved surfaces, particularly, for resurfacing roads and bridge decks in order to eliminate misalignments in the existing paved surface, caused by the presence of grooves and depressions resulting from traffic wear or other causes. Broadly defined, the material under consideration is a composite material in the form of a mastic or mortar prepared by blending: (1) an unsaturated polyester-type resin obtained by reacting dicarboxylic acids with glycols with (2) a specially selectively graded stone aggregate, and with (3) a cross-linking monomer, together with effective amounts of a free-radical initiator and an accelerator for the cross-linking reaction.

Owing to the particular nature of the polyester component and the selective size distribution of the stone aggregate component, the resulting mortar, on being applied to a pavement surface, sets to a resilient, durable overlay coating which tends to impart improved flexural strength, compressive strength and modulus of elasticity to the resurfaced pavement, as compared with the same properties of this pavement before resurfacing or with the properties of a pavement coated with a mortar formulated, using a like polyester resin, or a different resin, but blended with an aggregate that has not been selectively graded.

Unsaturated polyester for use in the preparation of the mortar of this invention may be formed by reacting essentially equimolar amounts of an unsaturated dicarboxylic acid, such as maleic, with a glycol (or glycols), such as hexamethylene glycol; or yet by reacting a mixture of unsaturated and saturated dicarboxylic acids with a glycol (or a mixture of glycols) again in essentially equimolar proportions of acid to glycol. In all events, at least 20 mol percent and preferably from about 25 to 100 mol percent of the dicarboxylic acids employed for the formation of the polyester should be unsaturated dicarboxylic acids to enable an effective cure (cross-linking) of the polyester at ambient temperatures upon applying the mortar of this invention to a paved surface. Any available cross-linking agent, for instance, styrene, vinyl toluene, methyl methacrylate or vinyl pyrrolidone, may be used for cross-linking and setting the mortar to a flexible, resilient surface coating. For all practical purposes, in view of its availability and cost, styrene is presently preferred.

While any suitable combination of an unsaturated dicarboxylic acid and a glycol would provide a polyester, cross-linkable with styrene or a like cross-linking monomer, and would permit forming a hardenable mortar with a selectively graded aggregate, mixtures of saturated and unsaturated carboxylic acids, at least 20 mol percent whereof and preferably 25 mol percent or more consists of unsaturated dicarboxylic acids, when reacted with an essentially equimolar quantity of a glycol (or a mixture of two or more glycols), will provide a polyester material capable of being cross-linked by styrene, or the like, and suitable for the preparation of the mortar in accordance with the invention. Thus, one can react a mixture of at least one saturated (non-olefinic) dicarboxylic acid, preferably from the group consisting of isophthalic, orthophthalic and adipic acids, with at least one unsaturated (olefinic) dicarboxylic acid, preferably from the group consisting of maleic and fumaric acids, with an equimolar amount of at least one glycol, preferably selected from the group of ethylene glycol, propylene glycol, diethylene glycol, dipropylene glycol and neopentyl glycol. For instance, a polyester may be formed by reacting orthophthalic, adipic and maleic acids in a 2:1:1 ratio with an equimolar amount of diethylene glycol. Phthalic anhydride, of course, can be substituted for orthophthalic acid and maleic anhydride for maleic acid.

As a cross-linking agent for the preparation of a polyester resin, styrene will be preferably employed in amounts which may range from about 10 to about 80% by weight of the polyester, although amounts from about 40 to about 60% are generally preferred in paving applications.

To initiate the cross-linking reaction, a suitable free radical initiator (catalyst), such as methyl ethyl ketone peroxide or a mixture thereof with benzoyl peroxide, may be employed together with a conventional reaction accelerator, such as cobalt naphthenate. Conventional catalytic amounts—from about 1 to about 2% by weight of the initiator and from about 0.2 to about 1% by weight of the accelerator, based on the final resin—well known to those skilled in the art, can be employed to effect cross-linking and to set (harden) the resin-aggregate mortar.

The conditions for the preparation of the organic polyester resin component of the mortar for resurfacing applications on paved surfaces can be varied in accordance with the generally known techniques of the art and depending upon temperature, weather conditions and the time available for a particular construction job. These techniques are taught, for instance, in the book by Bjorksten Research Laboratories, Inc., entitled "Polyesters and their Applications," published in 1956 by Reinhold Publishing Corporation of New York City. The concentrations of the initiator and the accelerator for the polymerization reaction can be varied to extend or to shorten the period of cure in accordance with the particular conditions of each surface application and the particular job specifications. The aforementioned saturated and unsaturated dicarboxylic acids and glycols are presently preferred because of their ready availability in commerce at relatively reasonable costs.

The polyester material, blended with a desirable quantity of the cross-linking agent, and with sufficient quantities of initiator and accelerator to start the reaction and to allow the desired time for making and applying the mortar, is intimately and vigorously mixed with the selectively graded aggregate to make a mastic-like mortar. The aggregate used in the mixture is graded by screening to provide a critical range of sizes in accordance with an equation:

$$\log Y = a \log X + b$$

In this equation, Y stands for the percentage of the entire stone aggregate in the mixture passing through a maximum sieve opening of X inches. The constants $a$ and $b$ in this equation may vary from about 0.35 to about 0.55 and from about 2.30 to about 2.65, respectively. Thus, when the top or maximum size of the sieve is 8 mesh, $a$ is equal to 0.45 and $b$ is equal to 2.46, and the percentage of the entire aggregate passing through this sieve or screen will be fairly defined by a corresponding equation:

$$\log Y = 0.45 \log X + 2.46$$

Depending on whether a thinner or a thicker application of mortar is required, the distribution of the stone aggregate can be varied (i.e., by varying the values of $a$ and $b$ in the equation within the ranges indicated).

As a general rule, the maximum size of the aggregate should not exceed about half of the minimum thickness of the mortar overlay to be applied to the paved surface, and these overlays may be from 1/8" to 1/2" and thicker, if desired. Otherwise, any mineral aggregate is satisfactory for preparing the mortar, siliceous or calcareous sands being preferred.

As pointed out already, the preparation of the organic polyester resin component is carried out in a suitable manner in accordance with the known teachings of the art: the necessary dicarboxylic acids and glycols are reacted together, forming a polyester, and the cross-linking agent therefor, such as styrene, is added to the polyester in a proportion, for instance, of 40%. The resulting polyester mixture then receives the addition of an initiator and an accelerator of the cross-linking reaction, and the whole is now combined and thoroughly mixed with selectively graded stone aggregate. The set (cure) takes from about 30 minutes and longer. To make mixing operations easier, more styrene, say 50%, may be used instead of 40%; this, in addition, may aid in extending the time of cure. The mixing operation is carried out in any known suitable manner, for instance, using an efficient blade mixer or a mixer similar to a concrete pugmill. Immediately upon being formed, the mortar is ready for application to a paved surface, which should have been precleaned, for instance, by brushing, sweeping and etching the swept surface with an acid.

A number of representative samples of mortars or mastics have been prepared in accordance with the invention, applied as coatings to specimens of concrete, and the improvement of various physical properties of these specimens have been compared with the properties of untreated (non-coated) concrete, and with the properties of specimens treated with polyester resin mortars in which the aggregate has not been selectively graded.

To prepare the resin component for these samples 60% by weight of an unsaturated polyester, formed by reacting a mixture of isophthalic and fumaric acids, (in a 3 to 4 weight ratio) with a mixture of diethylene glycol and ethylene glycol (in a 4 to 1 weight ratio), was blended with 40% of styrene. The aggregate component of the mortar was graded in accordance with the aforegiven equation. The following Table I gives a standard sieve analysis of this graded aggregate.

TABLE I.—SCREEN ANALYSIS OF GRADED AGGREGATE

| U.S. sieve No. | Sieve opening (inches) | Percent passing | |
|---|---|---|---|
| | | Graded sample | According to equation |
| 4 | 0.187 | 100 | 100 |
| 8 | 0.0937 | 100 | 100 |
| 16 | 0.0469 | 69.9 | 72 |
| 30 | 0.0232 | 46.9 | 52 |
| 50 | 0.0117 | 43.2 | 39 |
| 100 | 0.0059 | 32.9 | 29 |
| 200 | 0.0029 | 19.9 | 21 |

In preparing this graded component, four fractions of mineral aggregate have been used:

(1) 40.7% by weight of coarse sand-blasting sand ranging in size from 8 mesh to 20 mesh;
(2) 16.2% by weight of medium sand ranging in size from 16 mesh to 50 mesh;
(3) 24.4% by weight of fine sand ranging in size from 70 mesh to 270 mesh;
(4) 18.7% by weight of mineral filler (calcite), all of which passed 200 mesh screen.

The mortar was formed by adding to this graded aggregate mix about 10% by weight of the aforedescribed mixture of polyester and cross-linking styrene monomer, together with necessary catalytic amounts of the initiator and reaction accelerator.

To determine and compare the enhancement of flexural strength obtainable by employing the polyester-aggregate mortars in accordance with the invention, standard concrete prismatic beams, cast 5¾" x 6" x 34", were coated with the aforedescribed mortar (a coating ¼" thick) to give beams of 6" x 6" x 34" in actual size. Similar beams were also coated with a mortar prepared by mixing the same polyester resin with sand of one size only, namely, No. 8 sieve. The tests were first carried out along the lines of ASTM Flexural Test C78–49, with the mortar coating up, compressive forces acting.

Table II shows the results of this test for flexural strength, which indicate that the specimens coated with the resin-aggregate mortar of the invention withstand greater flexure than the uncoated specimens, or those specimens which have been coated with polyester-sand mixtures in which the sand has not been selectively graded.

TABLE II

| Specimen of concrete | Total load in pounds | Modulus of rupture in p.s.i. |
|---|---|---|
| Uncoated | 4,660 | 430 |
| Coated with polyester-sand (ungraded, one-size) mixture | 5,400 | 435 |
| Coated with polyester mortar with graded aggregate | 6,360 | 545 |

In a parallel series of tests for flexural strength, again uncoated concrete specimens (prismatic beams) were compared with specimens coated with a mixture of the same polyester resin and ungraded, one-size (No. 8 sieve) sand, and with those coated with the mortar prepared in accordance with the invention, the coating being applied on the bottom of the concrete beam subjected to testing. The results are assembled in Table III and show superiority of the concrete specimens coated with the mortar made from polyester resin and graded aggregate.

TABLE III

| Specimen of concrete | Total load in pounds | Modulus of rupture in p.s.i. |
|---|---|---|
| Uncoated | 5,420 | 465 |
| Coated with polyester-sand (ungraded, one-size) mixture | 6,000 | 500 |
| Coated with polyester mortar with graded aggregate | 6,700 | 565 |

In neither series was there observed any failure of the bond between the overlay coating and the concrete.

In addition to testing for flexural strength, comparison tests to demonstrate a greatly superior compressive strength of the mortars prepared in accordance with the invention were carried out in conformity with the standard ASTM test C39–49. Cylindrical specimens 6″ in diameter and 12″ long, thoroughly cured, have been tested in compression. The results of these tests are tabulated in the following Table IV and indicate both the values of compressive strength in p.s.i. and those of the modulus of elasticity.

TABLE IV

| Specimen | Compressive load in pounds | Compressive strength p.s.i. | Modulus of elasticity, p.s.i. |
|---|---|---|---|
| Concrete | 135,000 | 4,810 | $2.22 \times 10^6$ |
| Mortar prepared with polyester resin and graded aggregate | 299,000 | 10,870 | $3.38 \times 10^6$ |

Compressive strengths were also determined using 2″ cubes of mortars prepared by blending different ungraded sand aggregates with 10% of the polyester resin described above. These values were compared with the values of compressive strength obtained with 2″ cubes of the mortar prepared with the graded aggregates and 10% of the same cross-linked polyester resin. The results of these tests are shown in Table V.

TABLE V

| Test No. | Aggregate (sand) type | Percent | Ultimate compression load in pounds |
|---|---|---|---|
| 1 | Coarse sand | 100 | 20,600 |
| 2 | Coarse sand | 70 | 19,000 |
|   | Medium sand | 30 |  |
| 3 | Medium sand | 100 | 19,600 |
| 4 | Coarse sand | 30 | 21,600 |
|   | Medium sand | 20 |  |
|   | Fine sand | 50 |  |
| 5 | Graded mixture of— |  | [1] 47,000 |
|   | Coarse sand | 40.7 |  |
|   | Medium sand | 16.2 |  |
|   | Fine sand | 24.4 |  |
|   | Mineral filler | 18.7 |  |

[1] Average of 2 tests.

The markedly superior compressive strength of the mortars, such as the one prepared with the selectively graded mix of Test No. 5 was also demonstrated in another series of tests, in which the mortar was prepared using 12% of a 50:50 blend of styrene and the polyester employed in the preceding tests. The average value of the ultimate compressive load withstood by the specimen before failure in this case was even more spectacular and amounted to 59,200 pounds.

The foregoing description and comparative data presented therewith show that mortars prepared by blending the aforedescribed polyester type resins with selectively graded stone aggregates, such as siliceous or calcareous sands, offer to the industry new and useful materials for effectively coating and resurfacing paved surfaces, such as road pavements, bridge decks, grade separations, and the like.

These hardenable mortars, prepared in accordance with the invention, can be applied to all kinds of conventional paved surfaces, whether constructed of portland cement concrete (PCC), resin-bound aggregate or a similar paving material, and they are particularly effective for surfacing concrete pavements misaligned through wear or otherwise, and displaying grooves, depressions and fractures. These mortars containing from at least 6 to about 16% by weight of the polyester resin, and preferably from about 8 to about 12% by weight of the resin, the balance to make up 100% by weight of the mortar being the graded aggregate, provide a very strong bond with the underlying concrete pavement and protect it from further damage.

The unexpectedly high compressive strength of the overlays laid with these mortars makes them especially applicable in areas subjected to intense traffic wear, and this at a very low cost, considering the very small amount of the resin component (6–16%) required for the preparation of an effective mortar which hardens to a substantially voidless, impervious top surface layer.

The surface of overlays formed with these mortars is sufficiently flexible at ambient outdoor temperatures throughout the year and accordingly is practically unsusceptible to cracking. Flexibility of the resinous mortar coatings can be controlled by a judicious selection of dicarboxylic acid components of the polyester and by varying the relative proportions of these acids within the operative range (at least 20 mol percent, and preferably from 25 mol percent and upward, of unsaturated acids) specified hereinabove. Flexibility may be also controlled by varying appropriately the proportions of the aggregate within the terms imposed by the grading equation:

$$\log Y = a \log x + b$$

Furthermore, flexibility of the mortar-made overlays may be improved by varying the proportions of the cross-linking agent, such as styrene or the like. Thus, the polyester resin formed by reacting isophthalic, adipic and maleic acids in a weight ratio of 2:1:1 with diethylene glycol, and cross-linked with 50% of styrene, will be more flexible than, for instance, the polyester resin formed by reacting isophthalic and fumaric acids in a 3:4 weight ratio with a mixture of diethylene glycol and ethylene glycol in a 4:1 weight ratio, and cross-linking the resulting polyester with 40% styrene. The time required for curing these more flexible resins will accordingly be much longer, and they will be subject to less shrinkage.

Coating surfaces produced by applying the mortars formed from these polyester resins and graded aggregates adhere firmly to the underlying paved surfaces, are satisfactory in appearance, and more economical as compared with many other types of known coating materials. They wear and last well under heavy traffic, are free from skidding, and their application can be carried out rapidly with a minimum of disruption of the vehicular traffic.

The coatings may be applied to the paved surface in any known, suitable manner, as by flowing on, shovelling, screeding, dumping and spreading on with a blade, a roller, or the like. Before applying the mortar, the undersurface is cleaned in any conventional, effective way, for instance, by scraping, scrubbing, brushing, sand-blasting and/or etching with acid, and the like, the particular method of cleaning in each case being dependent on the nature and the condition of the pavement being treated, as understood by those skilled in the art. After the surface has been cleaned, one or, if necessary, two tack coats of the same polyester resin, as used in the preparation of the mortar should be first applied to the cleaned surface to seal it, and to provide adequate adhesion and facilitate application of the mortar and its firm bonding to the undersurface. The mortar is added while the tack coat (or coats) is still in uncured state. The time of cure can be varied and extended, as mentioned hereinbefore, by varying the nature and the proportions of the initiator (catalyst) and of the reaction accelerator. Preferably the cure should not take longer than one hour, for beyond this time the mortar is often too difficult to work. The treated surface generally can be open to traffic after from 12 to 24 hours, depending, of course, on the thickness of the applied mortar layer which may be from ⅛″ to ½″, and preferably ¼″, thick.

After application the surface of the mortar layer may be finished by trowelling, rolling, brooming, brushing, etc. If deemed necessary to minimize skidding, a layer of conventional fine angular grit may be spread on the mortar overlay before it is completely cured.

While the mortars of the invention are described hereinabove as being particularly useful for treating paved road and like surfaces, the mortars are also useful in a variety of other applications in the building industry, namely, as coatings for concrete beams, columns, bricks, etc. When applied to floors, walls and ceilings, whether built of concrete, resin-aggregate, and the like, these mortars enhance substantially the physical properties (compressive strength, flexural strength, modulus of elasticity, etc.) of such surfaces and prevent their strain and failure due to repeated and persistent exertion and wear.

It is to be understood that the wording "hardenable mortars" includes all mortars consisting essentially of polyester-styrene blends (A) and selectively graded aggregate (B), as described in the above specification and defined in the following claims. This wording includes all such mortars, irrespective of whether or not such mortars are in a workable state, upon having mixed together the several components thereof; or are in a form of a top coating, after having been applied to an undersurface, such as a concrete surface, but still incompletely cured (incompletely hardened); or yet when these mortars are in a hardened state, after having been applied to an undersurface and completely cured.

We claim:

1. A method for laying skidproof resurfacing coatings on pavements, which comprises:

forming a mortar by intimately mixing from about 3 to about 8% by weight of a polyester reaction product of a glycol with a dicarboxyl acid selected from the group of saturated and unsaturated dicarboxylic acids, at least 20 mol percent of the acid whereof is unsaturated, with from about 3 to about 8% by weight of styrene and from about 94 to about 84% by weight, to make up a total of 100% by weight, of a mineral aggregate selectively graded to include size 8 mesh aggregate by screening it through a series of at least four sieves, the largest of which is a sieve No. 8 mesh and the smallest one is a sieve No. 200 mesh, in U.S. Sieve Series, in conformity with the equation:

$$\log Y = a \log X + b$$

in which equation $Y$ is the percentage of total aggregate passing through a sieve having an opening of $X$ inches, and the values of $a$ and $b$ range from about 0.35 to about 0.55 and from about 2.35 to about 2.65, respectively;

initiating the cross-linking of said polyester by said styrene by admixing to the mortar effective quantities of a free-radical initiator and an accelerator of cross-linking;

and applying said mortar to a paved base as a surface overlay which hardens at ambient temperature.

2. A method as defined in claim 1 wherein said polyester reaction product is obtained by reacting essentially equimolar amounts of a dicarboxylic acid from the group consisting of isophthalic, orthophthalic, adipic, maleic and fumaric acids and a glycol from the group consisting of ethylene glycol, diethylene glycol, propylene glycol, dipropylene glycol and neopentyl glycol, with at least 25 mol percent of the acid being unsaturated.

References Cited

UNITED STATES PATENTS

| | | | |
|---|---|---|---|
| 2,751,775 | 6/1956 | Sergovic | 260—40 |
| 2,814,836 | 12/1957 | Russell | 117—123 X |
| 3,008,387 | 8/1961 | Wittenwyler et al. | 117—161 X |
| 3,145,502 | 8/1964 | Rubenstein | 117—123 |
| 3,189,568 | 6/1965 | Sparks et al. | 260—40 X |

WILLIAM D. MARTIN, *Primary Examiner.*

R. HUSACK, *Assistant Examiner.*

U.S. Cl. X.R.

117—123, 161, 72, 33; 260—40